Figure 1:
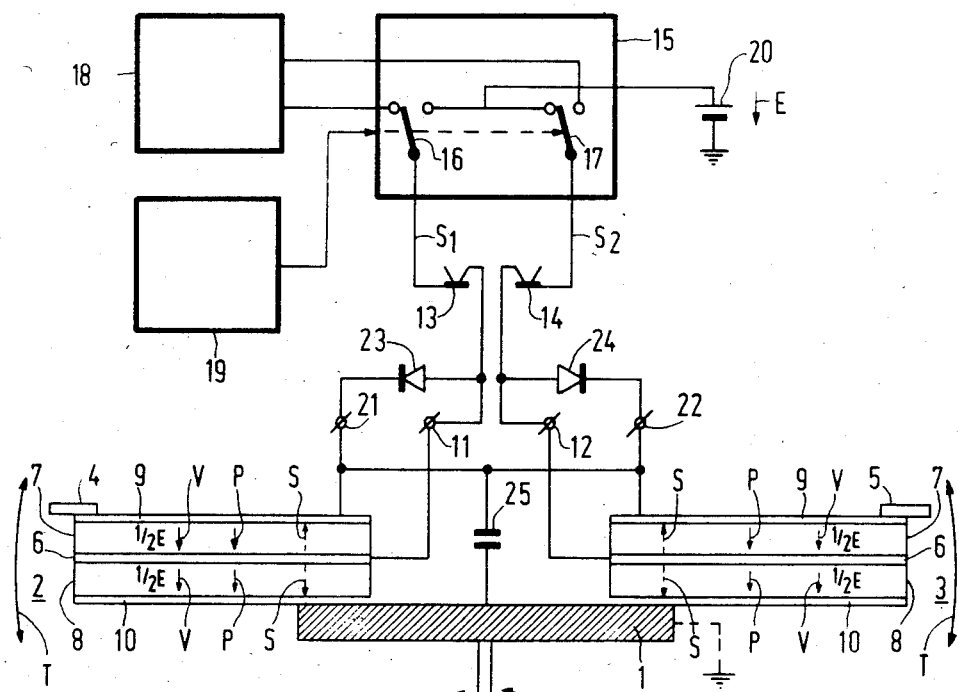

United States Patent [19]

Bergmans

[11] Patent Number: 4,558,381

[45] Date of Patent: Dec. 10, 1985

[54] HIGH SPEED SCANNING ARRANGEMENT FOR VIDEO TAPE RECORDER

[75] Inventor: Hendrik J. Bergmans, Eindhoven, Netherlands

[73] Assignee: U.S. Philips Corporation, New York, N.Y.

[21] Appl. No.: 524,729

[22] Filed: Aug. 19, 1983

[30] Foreign Application Priority Data

Jun. 10, 1983 [NL] Netherlands .................. 8302075

[51] Int. Cl.$^4$ .............................................. G11B 5/52
[52] U.S. Cl. .................................................. 360/77
[58] Field of Search ........................................ 360/77

[56] References Cited

U.S. PATENT DOCUMENTS 4,169,276 9/1979 Rodal .................................. 360/77
4,233,637 11/1980 Kubota ................................ 360/10

*Primary Examiner*—George G. Stellar
*Attorney, Agent, or Firm*—Robert T. Mayer

[57] ABSTRACT

In a helical scan video recorder in which the magnetic heads are arranged on bimorph piezoelectric actuators it may be desirable, in order to counteract depolarization of the piezoelectric elements, to bias these elements. This is possible without the use of additional slip rings if the electrode to which the drive voltage is applied is connected, via a diode, to the electrode to which the bias is applied and the bias is applied, alternately with the drive voltage, at instants at which the associated magnetic head is not used. If the (lower) drive voltage is applied the diode is cut off and the bias is isolated from the drive.

5 Claims, 3 Drawing Figures

HIGH SPEED SCANNING ARRANGEMENT FOR VIDEO TAPE RECORDER

The invention relates to an apparatus for recording and/or reproducing information on a record carrier in the form of a tape in tracks which are inclined relative to the longitudinal axis of the record carrier, which apparatus comprises a first magnetic head, a first electro-mechanical actuator on which said magnetic head is arranged for controlling the position of said magnetic head in a direction transverse to the tracks, said actuator comprising two piezoelectric transducers which are each arranged on one side of a common electrode and which are each provided with an electrode on the side which is remote from said common electrode, a rotatable body, on which said actuator is mounted for moving the magnetic head in the track direction, a tracking-signal generator for applying a signal to the actuator for controlling the position of the magnetic head relative to the tracks, a drive-signal input which is coupled to electrodes of the piezoelectric transducers in such a way that the transducer deflects as a function of the signal applied to said drive-signal input, and a first rotary signal-coupling means for coupling the tracking-signal generator to the drive-signal input of the actuator.

Such apparatus is used in commercially available video recorders of the well-known V2000 system. Such a video recorder is very suitable to be provided with a mode of operation in which the pictures can be reproduced at a substantially higher speed in order to locate a specific passage. The reproduction in this mode remains excellent because the electromechanical actuator ensures that the head follows the track correctly. The maximum reproduction speed is dictated by the maximum deflection of the actuator, which maximum deflection depends on the maximum driving voltage. The maximum driving voltage depends on the depolarization limit of the piezoelectric elements. It is known, inter alia from German Patent Application No. 27 11 691, which has been laid open to public inspection, that the application of a bias counteracts depolarization, so that the maximum deflection can be increased by applying a bias. This means that the maximum reproduction speed can be increased by applying a bias voltage. Moreover, each actuator (the afore-mentioned video recorder comprises two such actuators) would require the use of an additional signal-coupling means, such as a slip ring.

The invention aims at providing an apparatus of the type mentioned in the opening paragraph which allows a bias voltage to be applied without the use of additional signal-coupling means and to this end it is characterized by a bias-voltage input for applying a bias so that both piezoelectric elements are biased in the direction of polarization, at least during periods in which they are driven by the drive signal, a buffer element for buffering said bias voltage during said periods, a first voltage isolator between the bias-voltage input and the drive-voltage input, and switching means arranged between the tracking-signal generator and the signal-coupling means, for alternately connecting the drive-signal input to the tracking-signal generator and a source of bias voltage via said signal-coupling means.

The invention is based on the recognition of the fact that it is thus possible to apply a voltage pulse, for example at times when the head is not used (for example during the period in which the second head follows the track). This voltage pulse is applied to the buffer via the voltage isolator. If subsequently the drive signal, whose amplitude is lower, is applied the voltage isolator isolates the buffer from the drive signal input.

In an apparatus comprising a second electro-mechanical actuator of the same type as the first actuator, which second actuator carries a second magnetic head, is also mounted on the rotatable body, and is connected to the tracking-signal generator via a second rotary signal coupling means and switching means, the invention may further be characterized in that the bias-voltage input of said second actuator is connected to the bias-voltage input of the first actuator, both bias-voltage inputs have a common connection to the buffer element, and a second voltage isolator is arranged between the drive-voltage input of the second actuator and the bias-voltage input of said second actuator.

With respect to the buffer element the invention may further be characterized in that the buffer element comprises a capacitor.

With respect to the voltage isolator the invention may further be characterized in that the first or the second voltage isolator comprises a diode which is poled in the forward direction between the relevant drive-voltage input and the relevant signal-voltage input.

A preferred embodiment of the invention may further be characterized in that the two piezoelectric elements arranged on both sides of the common electrode are biased in opposite directions relative to said common electrode, the drive-voltage input is connected to the other electrode of one piezoelectric element and the other electrode of the other piezoelectric element is coupled to earth.

Figure 2:
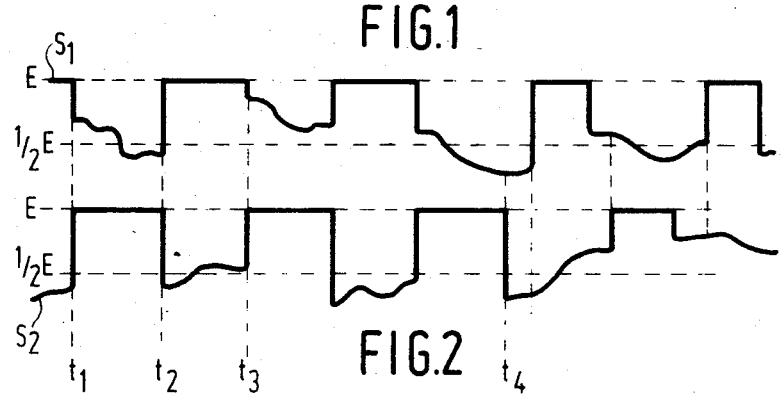
Figure 3:
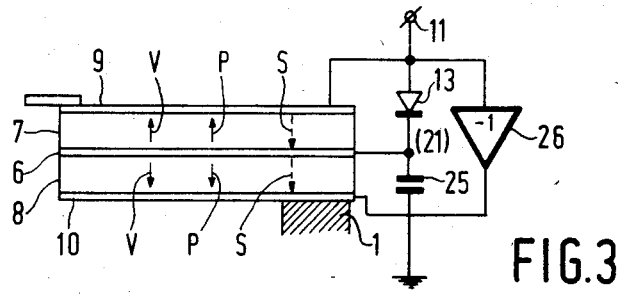

The invention will now be described in more detail, be way of example, with reference to the drawing, in which FIG. 1 shows an embodiment of the invention, FIG. 2 shows some signal waveforms to explain the operation of the apparatus in accordance with the invention, and FIG. 3 shows an alternative to a part of the embodiment shown in FIG. 1.

FIG. 1 shows an embodiment of the invention. On a rotatable body 1, shown schematically, two electro-mechanical actuators 2 and 3 are arranged diametrally opposite each other, which actuators carry video heads 4 and 5, respectively. Via means, not shown, for example a rotary transformer, these video heads are connected to the non-rotating part of the apparatus. This assembly rotates within a drum around which a magnetic head is wrapped along a helical path over 180° (in said V2000 system). The heads 4 and 5 then alternately follow an inclined track on the magnetic tape. The electro-mechanical actuators 2 and 3 control the heads 4 and 5 in directions indicated by arrows T, i.e. in directions transverse to the direction of the tracks followed by these heads owing to the rotation of the body 1.

The electro-mechanical actuators 2 and 3 each have a common electrode 6, two piezoelectric elements 7 and 8 on both sides of the electrode 6, electrodes 9 and 10 being arranged on both sides of said elements which are remote from the electrode 6, so that the piezoelectric element 7 is arranged between the electrodes 6 and 9 and the piezoelectric element 8 between the electrodes 6 and 10. Both piezoelectric elements are polarized in the direction indicated by P.

In the present example the electrode 10 is connected to earth via the body 1. The common electrode 6 of the actuator 2 or 3 is connected to a drive-signal input, 11 and 12 respectively, which via a slip ring, 13 and 14 respectively, and switching means 15 is connected to a source 18 of tracking signals. Via a capacitor 25 the electrode 9 of the actuator, 2 and 3 respectively, is connected to earth and to a bias-voltage input, 21 and 22 respectively. Via a voltage isolator, in the present example a diode 23 or 24, this bias voltage input, 21 or 22, is connected to the corresponding drive-voltage input 11 or 12. The switching means 15, which may be electronic means, may be regarded as two change-over switches 16 and 17 which under control of a device 19 alternately connect the tracking signal generator 18 to one of the slip rings 13 and 14 and which connect a direct voltage source 20 to the other slip ring in phase opposition.

The operation of the apparatus shown in FIG. 1 will be explained with reference to FIG. 2 which shows the signals $S_1$ and $S_2$ on the slip rings 13 and 14, respectively, as a function of time.

Between the instants $t_1$ and $t_2$ a tracking signal is applied to the slip ring 13. If it is assumed that capacitor 25 carries a higher direct voltage (E), the diode 23 will be cut off. The common electrode 6 of the actuator 2 then receives a signal which appears in parallel across both piezoelements, as indicated by the dashed arrows S, because the electrode 10 is connected directly and the electrode 9 is connected indirectly, via capacitor 25 and via diode 24 and source 20, to earth. In one element the polarity of the signal has the same direction as the polarization (P) and in the other element it is directed oppositely, so that the transducer 2 deflects in conformity with the signal $S_1$. The voltage E across capacitor 25 also appears on the electrode 9. Since the common electrode 6 is connected to the tracking signal source and the electrode 10 is connected to earth, this bias voltage is distributed uniformly as indicated by the arrows V between the two piezoelements in accordance with the polarization P. As a result of this, the neutral level of the actuator (no deflection) is obtained when the voltage on the common electrode 6 is $\frac{1}{2}$E (electrode 9 is then at E and electrode 10 at 0 V). The steady-state d.c. level of the tracking signal should then also be $\frac{1}{2}$E.

At the same time the direct voltage E from source 20 will appear on slip ring 14 (signal $S_2$). If the charge on capacitor 25 is not sufficient, capacitor 25 will be charged substantially to the voltage E (but for one diode voltage) via the diode 24 which then conducts. The voltage on electrode 9 of element 3 and, via drive signal input 12, on the common electrode 6 is then E volts. This results in a substantial deflection of the actuator in conformity with the drive signal of E volts, but this is no problem because the head 5 is inoperative during this period. At the instant $t_2$ the signal $S_2$ on slip ring 14 changes over from the direct voltage E to the tracking signal. Diode 24 is then cut off. The tracking signal then appears on the common electrode 6 and capacitor 25 is charged.

The same happens between the instants $t_2$ and $t_3$ but now actuators 2 and 3 are interchanged.

It is to be noted that a system is conceivable in which both heads are operative simultaneously, for example in the case of a tape-wrapping angle of 210°, the additional 30° wrap being used for audio recording. Switches 16 and 17 must then be operated so that the voltage E is transferred during a shorter period, for example after the instant $t_4$ as shown in FIG. 2. The switching means 15 must then be modified so that each of the drive inputs 11 and 15 can receive an independent drive signal, at least when both heads are driven simultaneously.

In principle it is also possible to re-charge the capacitor 25 with shorter voltage pulses. The invention may, in principle, also be employed in single-head video recorders.

FIG. 3 shows a possible variant to the device shown in FIG. 1, in which both piezoelectric elements 7 and 8 are polarized in the same direction viewed from the common electrode 6. The drive signal must then be applied to electrodes 9 and 10 in phase opposition in order to obtain a deflection and the bias-voltage input 21 must be connected to the mean voltage across the buffer capacitor 25. Instead of the diode 25 active voltage isolators may then be used.

What is claimed is:

1. An apparatus for recording and/or reproducing information on a record carrier in the form of a tape in tracks which are inclined relative to the longitudinal axis of the record carrier, which apparatus comprises
   a first magnetic head,
   a first electro-mechanical actuator on which said magnetic head is arranged for controlling the position of said magnetic head in a direction transverse to the tracks, said actuator comprising two piezoelectric transducers which are each arranged on one side of a common electrode and which are each provided with an electrode on the side which is remote from said common electrode,
   a rotatable body, on which said actuator is mounted, for moving the magnetic head in the track direction,
   a tracking signal generator for supplying a signal to the actuator for controlling the position of the magnetic head relative to the tracks,
   a drive signal input which is coupled to electrodes of the piezoelectric transducers in such a way that the transducer deflects as a function of the signal applied to said drive signal input, and
   a first rotary signal-coupling means for coupling the drive signal generator to the drive signal input of actuator, characterized by
   a bias voltage input for applying a bias voltage so that both piezoelectric elements are biased in the direction of polarization, at least during periods in which they are driven by the drive signal,
   a buffer element for buffering said bias voltage during said periods,
   a first voltage isolator between the bias voltage input and the drive voltage input, and
   switching means arranged between the tracking signal generator and the signal coupling means, for alternately connecting the drive signal input to the tracking signal generator and a source of bias voltage via said signal coupling means.

2. An apparatus as claimed in claim 1, comprising a second electro-mechanical actuator of the same type as the first actuator, which second actuator carries a second magnetic head, is also mounted on the rotatable body, and is connected to the tracking signal generator via a second rotary signal coupling means and switching means, characterized in that the bias voltage input of said second actuator is connected to the bias voltage input of the first actuator, both bias voltage inputs have a common connection to the buffer element, and a second voltage isolator is arranged between the drive voltage input of the second actuator and the bias voltage input of said second actuator.

3. An apparatus as claimed in claim 1 or 2, characterized in that the buffer element comprises a capacitor.

4. An apparatus as claimed in claim 3, characterized in that the first or the second voltage isolator comprises a diode which is poled in the forward direction between the relevant drive voltage input and the relevant signal voltage input.

5. An apparatus as claimed in claim 4, characterized in that the two piezoelectric elements arranged on both sides of the common electrode are biased in opposite directions relative to said common electrode, the drive voltage input is connected to the other electrode of one piezoelectric element and the other electrode of the other piezoelectric element is coupled to earth.

* * * * *